United States Patent
Herring

(10) Patent No.: US 11,293,354 B2
(45) Date of Patent: Apr. 5, 2022

(54) INTEGRATED COOLING AIR BOOST COMPRESSOR AND FUEL PUMP

(71) Applicant: United Technologies Corporation, Farmington, CT (US)

(72) Inventor: Neal R. Herring, East Hampton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 98 days.

(21) Appl. No.: 16/745,454

(22) Filed: Jan. 17, 2020

(65) Prior Publication Data
US 2020/0232394 A1    Jul. 23, 2020

Related U.S. Application Data

(60) Provisional application No. 62/793,441, filed on Jan. 17, 2019.

(51) Int. Cl.
*F02C 6/08* (2006.01)
*F02C 9/44* (2006.01)
*F02C 3/04* (2006.01)

(52) U.S. Cl.
CPC . *F02C 9/44* (2013.01); *F02C 3/04* (2013.01)

(58) Field of Classification Search
CPC .... F02C 7/236; F02C 6/08; B64D 2013/0648; B64D 13/08
See application file for complete search history.

(56) References Cited

U.S. PATENT DOCUMENTS

| 2,970,437 | A | 2/1961 | Anderson |
| 5,392,614 | A | 2/1995 | Coffinberry |
| 6,663,044 | B1 * | 12/2003 | Munoz ............... B64D 13/06 244/118.5 |
| 7,895,819 | B2 * | 3/2011 | Deldalle ............... F02C 6/08 60/39.281 |
| 9,810,158 | B2 * | 11/2017 | Foutch ............... F02C 7/18 |
| 2010/0003148 | A1 | 1/2010 | Deldalle |
| 2013/0187007 | A1 * | 7/2013 | Mackin ............... F02C 6/04 244/134 R |
| 2015/0275769 | A1 | 10/2015 | Foutch et al. |
| 2016/0265444 | A1 | 9/2016 | Pool et al. |
| 2017/0241340 | A1 * | 8/2017 | Feulner ............... F02C 6/08 |

(Continued)

FOREIGN PATENT DOCUMENTS

DE    102012207574 A1    11/2013

OTHER PUBLICATIONS

European Search Report for EP Application No. 20152559.9 dated Jun. 15, 2020.

*Primary Examiner* — Gerald L Sung

(74) *Attorney, Agent, or Firm* — Carlson, Gaskey & Olds, P.C.

(57) ABSTRACT

A gas turbine engine includes a main compressor section, a combustor, and a main turbine section. A fuel pump delivers fuel to the combustor. A tap taps air compressed by the main compressor section, and is connected for delivering the tapped air through a first heat exchanger and to a boost compressor. Air downstream of the boost compressor is connected to cool a component. Driving compressed air is connected to be delivered to a power turbine. The power turbine is connected to drive both the boost compressor and the fuel pump.

16 Claims, 2 Drawing Sheets

(56) References Cited

U.S. PATENT DOCUMENTS

| | | | |
|---|---|---|---|
| 2018/0080383 A1* | 3/2018 | Snape | F02C 6/08 |
| 2019/0162121 A1* | 5/2019 | Staubach | F02C 7/185 |
| 2019/0360349 A1* | 11/2019 | Schwarz | F04D 29/5826 |

* cited by examiner

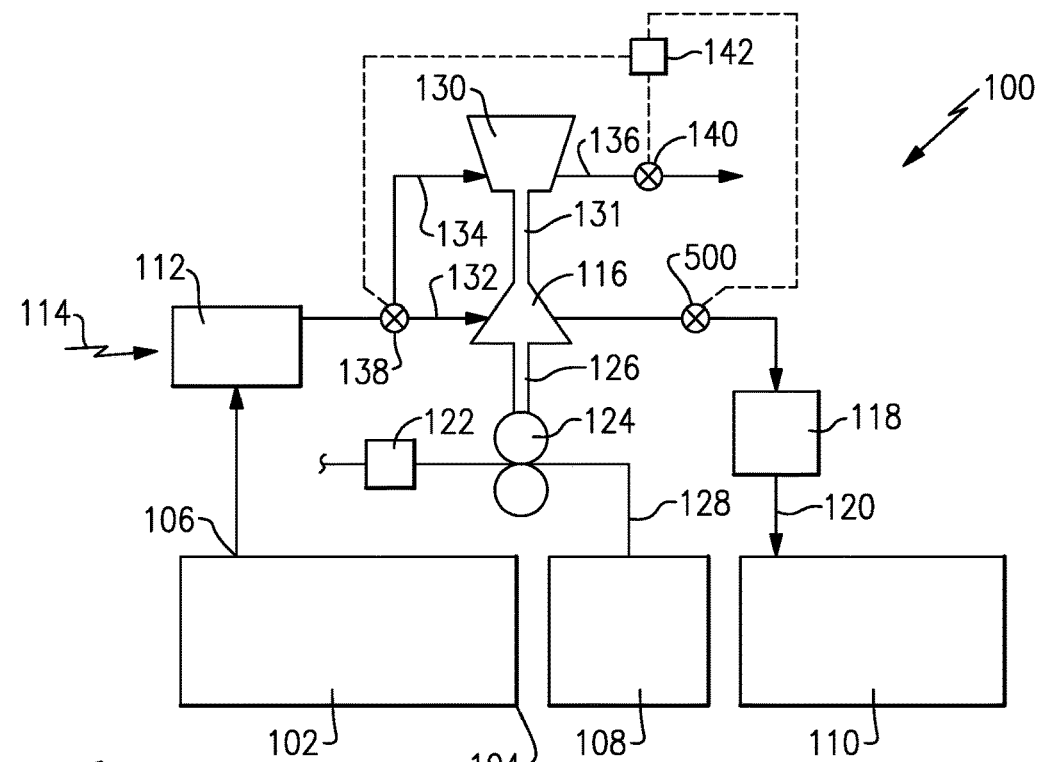
FIG.2
FIG.4
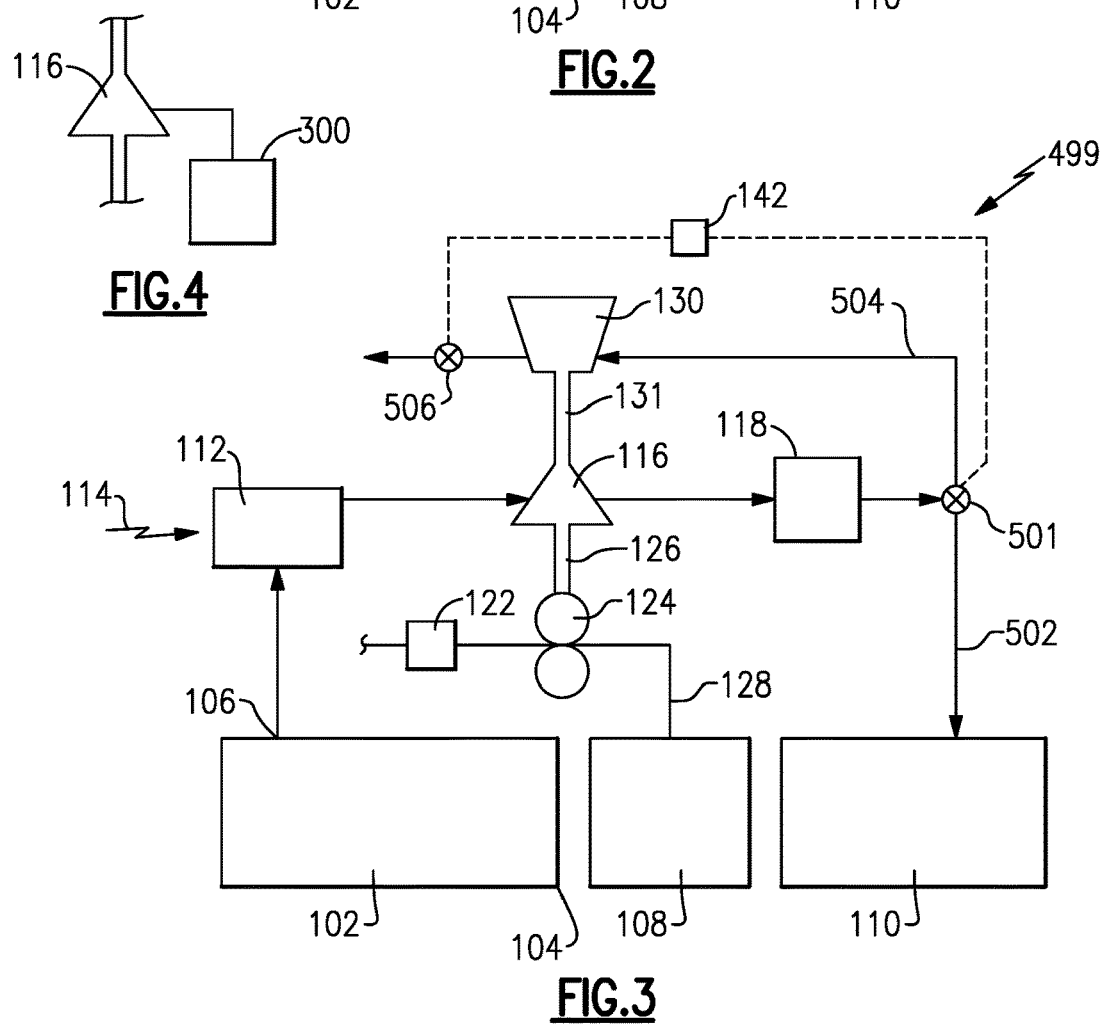
FIG.3

INTEGRATED COOLING AIR BOOST COMPRESSOR AND FUEL PUMP

CROSS-REFERENCE TO RELATED APPLICATION

This application claims priority to U.S. Provisional Application No. 62/793,441 filed Jan. 17, 2019.

BACKGROUND

This application relates to a system to provide cooling air and fuel in a gas turbine engine.

Gas turbine engines are known and typically include a fan delivering air into a bypass duct for propulsion. The fan also delivers air into a compressor where it is compressed and then delivered into a combustor. The air is mixed with fuel and ignited in the combustor and products of that combustion pass downstream over turbine rotors.

It is known that various locations in the gas turbine engine are exposed to high heat. Thus, cooling air is supplied to several components. The cooling air is typically tapped from the main compressor section. At times, it is desirable to boost the pressure of this cooling air and, thus, it is known to provide a boost compressor.

It is also known to provide fuel to the combustor from a fuel pump.

The fuel pump has typically been driven by a shaft rotating with the turbine.

SUMMARY

In a featured embodiment, a gas turbine engine includes a main compressor section, a combustor, and a main turbine section. A fuel pump delivers fuel to the combustor. A tap taps air compressed by the main compressor section, and is connected for delivering the tapped air through a first heat exchanger and to a boost compressor. Air downstream of the boost compressor is connected to cool a component. Driving compressed air is connected to be delivered to a power turbine. The power turbine is connected to drive both the boost compressor and the fuel pump.

In another embodiment according to the previous embodiment, a junction downstream of the first heat exchanger splits the tapped air into a first flow connected to the boost compressor and into a second flow connected to the power turbine.

In another embodiment according to any of the previous embodiments, a first valve is located at the junction and is operable to vary the amount of air delivered to the power turbine.

In another embodiment according to any of the previous embodiments, a second valve was positioned downstream of the power turbine and is operable to control the amount of air delivered across the power turbine.

In another embodiment according to any of the previous embodiments, the second valve is selectively moved to increase resistance to air flow and, thus, limit the air flow across the power turbine.

In another embodiment according to any of the previous embodiments, a shaft driven by one of the boost compressor and the fuel pump drives the other of the boost compressor and the fuel pump.

In another embodiment according to any of the previous embodiments, a control is programmed to control at least one valve to vary the amount of air delivered across the power turbine.

In another embodiment according to any of the previous embodiments, a control is programmed to control at least one valve to vary the amount of air delivered across the power turbine.

In another embodiment according to any of the previous embodiments, a first valve is located at the junction and is operable to vary the amount of air delivered to the power turbine.

In another embodiment according to any of the previous embodiments, a second valve was positioned downstream of the power turbine and is operable to control the amount of air delivered across the power turbine.

In another embodiment according to any of the previous embodiments, the second valve is selectively moved to increase resistance to air flow and, thus, limit the air flow across the power turbine.

In another embodiment according to any of the previous embodiments, a shaft driven by one of the boost compressor and the fuel pump drives the other of the boost compressor and the fuel pump.

In another embodiment according to any of the previous embodiments, a control is programmed to control at least one valve to vary the amount of air delivered across the power turbine.

In another embodiment according to any of the previous embodiments, the control provides a greater amount of air to the power turbine at higher power operation of the engine, and reduces the amount of air provided to the power turbine from the higher amount of air at lower power operation. The higher power operation at least includes take-off of an associated aircraft and the lower power operation at least includes cruise of an associated aircraft.

In another embodiment according to any of the previous embodiments, a second heat exchanger is positioned downstream of the boost compressor. The air downstream of the second heat exchanger is split between being connected to cool the at least one rotatable component in at least one of the main compressor section and main turbine section. A second flow is connected paths across the power turbine.

These and other features may be best understood from the following drawings and specification.

BRIEF DESCRIPTION OF THE DRAWINGS

FIG. 2 shows a gas turbine engine with associated systems.

FIG. 3 shows an alternative.

FIG. 4 shows another alternative.

DETAILED DESCRIPTION

Figure 1:
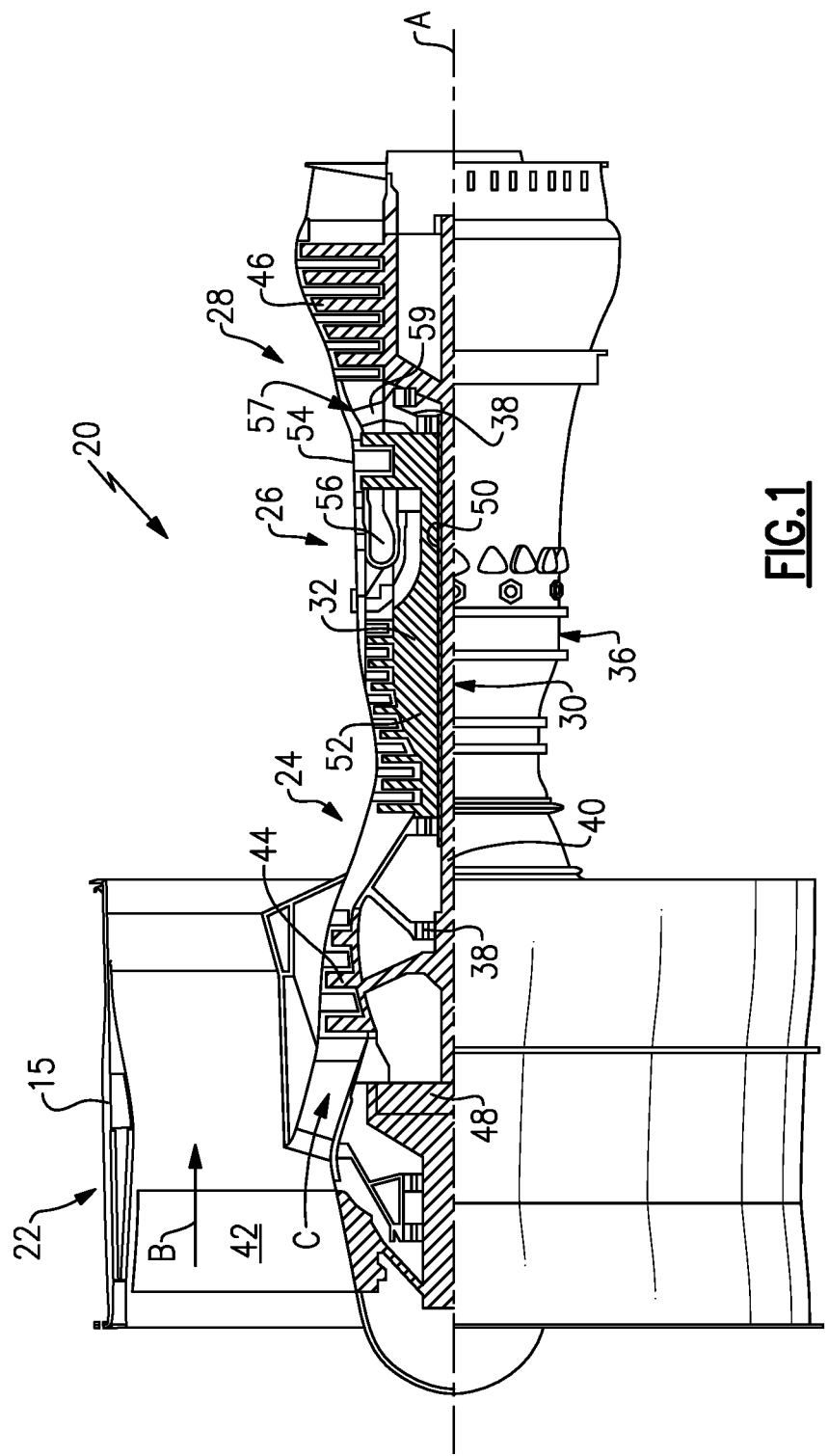
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

FIG. 2 shows an engine 100 schematically having a main compressor section 102 with a downstream most location 104. Air is tapped at 106 from a location within the main compressor section 102 where it has been at least partially compressed. In one embodiment, this air is tapped from a high pressure compressor section such as that disclosed in FIG. 1. The air tapped at 106 may be from a location upstream of downstream most location 104. Alternatively, the tap 106 could be downstream of the downstream most point 104, but would still tap compressed air.

The air from the main compressor section 102 is delivered into a combustor section 108, and products of the combustion pass downstream over a main turbine section 110. The combustor and main turbine sections may also be as generally shown in FIG. 1.

The tapped air at 106 is passed through a heat exchanger 112. Some way of cooling the cooling air in the heat exchanger 112 is provided. As an example, shown at 114 is the bypass air, from say the bypass duct of FIG. 1, passing over the heat exchanger 112 to cool the cooling air.

That air passes to a boost compressor 116 and an optional second heat exchanger 118. The air downstream of the heat exchanger 118 is shown at line 120 being returned to a core engine to cool a portion of the main turbine section 110. As an example, the air from line 120 may cool the high pressure turbine section.

Alternatively, the air from line 120 could be utilized to cool downstream portions of a high pressure compressor.

Thus, it could be said that the cooling air from line 120 is utilized to cool a rotating component in at least one of a main compressor and main turbine section.

In addition, the line 120 may pass radially into the core engine upstream of the combustor 108 and then flow axially toward the main turbine section 110. That is, FIG. 2 is an extremely schematic view.

A fuel tank 122 is shown providing fuel to a fuel pump 124. The fuel pump 124 is driven by a shaft 126. The fuel downstream of the fuel pump 124 passes into a line 128, and is then delivered to fuel nozzles in the combustor section 108. It should be understood that the actual fuel supply system includes many other components, and this is a schematic view to explain the operation of the fuel pump 124.

The shaft 126 also rotates with the boost compressor 116. A turbine 130 drives a shaft 131 to drive the boost compressor 116 and fuel pump 124. A junction, which may include a valve 138, downstream of the heat exchanger 112 splits the air into two flows 132 (heading to the boost compressor 116) and 134 (heading to the turbine 130).

Downstream of the turbine 130, the air enters into a line 136 and may be utilized for other functions on the engine, including cooling or another use on an aircraft associated with the gas turbine engine 100.

Valve 140 may control this flow. Valves 138 and 140 are shown schematically controlled by a control 142. Control 142 may be part of a full authority digital electronic controller (FADEC) for the engine 100, or may be a standalone controller. The control 142 is programmed to control valve 138 and/or valve 140 to adjust the flow of air to line 134, and control the speed at turbine 130 drives the boost compressor 116 and fuel pump 124.

Now, when the engine is operating at high power such as take-off, the line 134 receives a higher amount of air and drives the turbine 130 at higher speeds such that more fuel is delivered to line 128, and more cooling air is delivered to line 120. However, at lower power operation, such as idle or cruise, the amount of air delivered to line 134 may be limited by controlling either or both valves 138 and 140. This will allow the boost compressor 116 and fuel pump 124 to operate at slower speeds and deliver less cooling air and less fuel. This will increase the overall efficiency of the engine. The valve 140 could be moved towards closed, as an example, to increase resistance to air flow and, thus, limit the air flow across the power turbine 130.

The combination of a splitter valve 138 and throttle valve 140 allows for independent control over the shaft speed which will control fuel flow rate if fuel pump 124 is a positive displacement pump such as a gear pump, or fuel pressure if a dynamic pump 124 such as a centrifugal pump. These valves also control the flow rate of cooling air delivered to the engine 120. System complexity and performance are balanced to achieve an overall optimal system. Additional effectors (valves) could be added to provide even more control and flexibility to the system, but this comes at the expense of cost and reliability. For example, an additional valve 500 between the compressor 116 and second heat exchanger 118 would provide further control over the flow rate and pressure of the air returning to the engine at 120. This valve 500 could also be downstream of the second heat exchanger 118 before the flow returns to the engine.

It may also be desirable to mix flow taken from the compressor 106 with the cooled flow returning to the engine 120 to meet required cooling demands while also minimizing the size and weight of the cooling heat exchangers and turbomachinery.

FIG. 3 shows an embodiment 499, wherein components similar to those found in FIG. 2 are identified by the same reference numeral. Here, a valve 501 downstream of the second heat exchanger 118 splits the airflow into a flow 502 heading to cool the turbine section 110 and a second flow 504 for driving the turbine 130. A valve 506 downstream of the turbine operates much like valve 140.

FIG. 4 shows a feature wherein air downstream of boost compressor 116 is used to cool a component 300 other than a compressor or turbine section. Component 300 could be a fluid associated with the engine, such as oil. Alternatively, component 300 could be associated with an aircraft mounting the engine.

The valve 140 in the FIG. 2 embodiment could be moved upstream of the turbine and still have a similar control effect. Alternatively, a variable area turbine could be utilized in either the FIG. 1 or FIG. 2 embodiments.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a main compressor section, a combustor, and a main turbine section;
a fuel pump for delivering fuel to said combustor;
a tap for tapping air compressed by said main compressor section, and connected for delivering the tapped air through a first heat exchanger and to a boost compressor, air downstream of the boost compressor being connected to cool at least one rotatable component in said main compressor section or said main turbine section;
air being connected to be delivered to a power turbine, said power turbine being connected to drive both said boost compressor and said fuel pump;
wherein a control is programmed to control at least one valve to vary the amount of air delivered across said power turbine; and
wherein said control provides a greater amount of air to said power turbine at higher power operation of the engine, and reduces the amount of air provided to said power turbine from said greater amount of air at lower power operation, said higher power operation at least includes take-off of an associated aircraft and said lower power operation at least includes cruise of the associated aircraft.

2. The gas turbine engine as set forth in claim 1, wherein a junction downstream of said first heat exchanger splits the tapped air into a first flow connected to said boost compressor and into a second flow connected to said power turbine.

3. The gas turbine engine as set forth in claim 2, wherein the at least one valve includes a first valve is located at said junction and is operable to vary the amount of air delivered to said power turbine.

4. The gas turbine engine as set forth in claim 3, wherein the at least one valve also includes a second valve is positioned downstream of said power turbine and is operable to control the amount of air delivered across said power turbine.

5. The gas turbine engine as set forth in claim 4, the second valve is selectively moved to increase resistance to air flow and, thus, limit the air flow across the power turbine.

6. The gas turbine engine as set forth in claim 5, wherein a shaft is connected between said boost compressor and said fuel pump.

7. The gas turbine section as set forth in claim 6, wherein the control is programmed to control the first and second valves to vary the amount of air delivered across said power turbine.

8. The gas turbine engine as set forth in claim 1, wherein the at least one valve includes a first valve is located at said junction and is operable to vary the amount of air delivered to said power turbine.

9. The gas turbine engine as set forth in claim 8, wherein the at least one valve also includes a second valve is positioned downstream of said power turbine and is operable to control the amount of air delivered across said power turbine.

10. The gas turbine engine as set forth in claim 9, the second valve is selectively moved to increase resistance to air flow and, thus, limit the air flow across the power turbine.

11. The gas turbine engine as set forth in claim 10, wherein a shaft is connected between said boost compressor and said fuel pump.

12. The gas turbine engine as set forth in claim 11, the second valve is selectively moved to increase resistance to air flow and, thus, limit the air flow across the power turbine.

13. The gas turbine engine as set forth in claim 12, wherein a shaft is connected between said boost compressor and said fuel pump.

14. The gas turbine engine as set forth in claim 1, wherein a second heat exchanger is positioned downstream of said boost compressor, and the air downstream of said second heat exchanger is split between a first flow being connected to cool said at least one rotatable component in at least one of said main compressor section and said main turbine section, and a second flow connected to flow across said power turbine.

15. A gas turbine engine comprising:
    a main compressor section, a combustor, and a main turbine section;
    a fuel pump for delivering fuel to said combustor;
    a tap for tapping air compressed by said main compressor section, and connected for delivering the tapped air through a first heat exchanger and to a boost compressor, air downstream of the boost compressor being connected to cool at least one rotatable component in said main compressor section or said main turbine section;
    air being connected to be delivered to a power turbine, said power turbine being connected to drive both said boost compressor and said fuel pump; and
    wherein a junction downstream of said first heat exchanger splits the tapped air into a first flow connected to said boost compressor and into a second flow connected to said power turbine.

16. The gas turbine engine as set forth in claim 15, wherein a first valve is located at said junction and is operable to vary the amount of air delivered to said power turbine, wherein a second valve is positioned downstream of said power turbine and is operable to control the amount of air delivered across said power turbine.

* * * * *